US012643793B2

(12) United States Patent
Lee et al.

(10) Patent No.: US 12,643,793 B2
(45) Date of Patent: Jun. 2, 2026

(54) SILICON CARBON COMPOSITE, NEGATIVE ELECTRODE ACTIVE MATERIAL, NEGATIVE ELECTRODE COMPOSITION, NEGATIVE ELECTRODE, AND LITHIUM SECONDARY BATTERY

(71) Applicant: LG Energy Solution, Ltd., Seoul (KR)

(72) Inventors: Seunggwan Lee, Daejeon (KR); Taeho Kim, Daejeon (KR); Gunwoo Kim, Daejeon (KR); Sun Young Shin, Daejeon (KR); Yong Ju Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 37 days.

(21) Appl. No.: 18/913,566

(22) Filed: Oct. 11, 2024

(65) Prior Publication Data

US 2025/0122083 A1 Apr. 17, 2025

(30) Foreign Application Priority Data

Oct. 13, 2023 (KR) ........................ 10-2023-0136853

(51) Int. Cl.
  *C01B 33/00* (2006.01)
  *C01B 32/05* (2017.01)
  *C01B 32/97* (2017.01)
  (Continued)

(52) U.S. Cl.
  CPC .............. *C01B 33/00* (2013.01); *C01B 32/05* (2017.08); *C01B 32/97* (2017.08); *H01M 4/0471* (2013.01); *H01M 4/366* (2013.01); *H01M 4/386* (2013.01); *H01M 4/583* (2013.01); *H01M 4/587* (2013.01); *H01M 10/052* (2013.01); *H01M 10/0525* (2013.01); *C01P 2002/86* (2013.01);
  (Continued)

(58) Field of Classification Search
  CPC ......... C01B 33/00; C01B 32/05; C01B 32/97; H01M 4/583; H01M 4/386; H01M 4/366; H01M 4/0471; H01M 4/587; H01M 10/052; H01M 10/0525
  See application file for complete search history.

(56) References Cited

U.S. PATENT DOCUMENTS

| | | | |
|---|---|---|---|
| 10,333,139 | B2 | 6/2019 | Kondo |
| 2012/0070745 | A1 | 3/2012 | Ishida |
| 2016/0254537 | A1 | 9/2016 | Kamo et al. |
| 2018/0026262 | A1 | 1/2018 | Jeong et al. |
| 2022/0376238 | A1 | 11/2022 | Hirose |
| 2024/0222611 | A1 | 7/2024 | Luo |

FOREIGN PATENT DOCUMENTS

| | | |
|---|---|---|
| CN | 113258053 A | 8/2021 |
| CN | 115881931 A | 3/2023 |

(Continued)

*Primary Examiner* — Sarah A. Slifka

(74) *Attorney, Agent, or Firm* — Bryan Cave Leighton Paisner LLP

(57) ABSTRACT

A silicon carbon composite, a negative electrode active material, a negative electrode composition, a negative electrode, a lithium secondary battery, a battery module, and a battery pack are provided. The silicon carbon composite satisfies a condition of $1.3 \leq ((B+C)/A) < 4$, wherein A is an intensity of a peak having a chemical shift value in the range of 20 ppm to $-15$ ppm in a $^{29}$Si-MAS-NMR spectrum, B is an intensity of a peak having a chemical shift value in the range of $-20$ ppm to $-100$ ppm in the $^{29}$Si-MAS-NMR spectrum; and C is an intensity of a peak having a chemical shift value in the range of $-110$ ppm to $-140$ ppm in the $^{29}$Si-MAS-NMR spectrum.

19 Claims, 5 Drawing Sheets

EXAMPLE 1

(51) Int. Cl.

| | |
|---|---|
| *H01M 4/02* | (2006.01) |
| *H01M 4/04* | (2006.01) |
| *H01M 4/36* | (2006.01) |
| *H01M 4/38* | (2006.01) |
| *H01M 4/583* | (2010.01) |
| *H01M 4/587* | (2010.01) |
| *H01M 10/052* | (2010.01) |
| *H01M 10/0525* | (2010.01) |

(52) U.S. Cl.

CPC ...... *C01P 2002/89* (2013.01); *C01P 2004/80* (2013.01); *C01P 2006/12* (2013.01); *C01P 2006/14* (2013.01); *C01P 2006/16* (2013.01); *C01P 2006/40* (2013.01); *H01M 2004/021* (2013.01); *H01M 2004/027* (2013.01); *H01M 2220/30* (2013.01)

(56) References Cited

FOREIGN PATENT DOCUMENTS

| | | | |
|---|---|---|---|
| EP | 4340067 | A1 | 3/2024 |
| EP | 4379861 | A1 | 6/2024 |
| JP | 2007115548 | A | 5/2007 |
| JP | 2017-004727 | A | 1/2017 |
| JP | 7088438 | B1 | 6/2022 |
| KR | 2012-0029317 | A | 3/2012 |
| KR | 2015-0137946 | A | 12/2015 |
| KR | 2016-0079910 | A | 7/2016 |
| KR | 10-2016-0104560 | A | 9/2016 |
| KR | 10-2018-0009571 | A | 1/2018 |
| KR | 2022-0075218 | A | 6/2022 |
| KR | 2023-0083169 | A | 6/2023 |
| WO | 2022-236985 | A1 | 11/2022 |

| Peak No. | Intensity | Position / ppm | Width / ppm | $\frac{xG/(1-x)L}{0.3\ fixed}$ |
|---|---|---|---|---|
| 1 | 3.8E+09 | − 1.85 | 39 | 0.3 |
| 2 | 8.9E+09 | − 90.4 | 27 | 0.3 |
| 3 | 1.1E+09 | −128 | 15 | 0.3 |
| 4 | 1.2E+09 | −26.0 | 34 | 0.3 |
| 5 | 1.7E+09 | − 62.1 | 36 | 0.3 |
| 6 | 7.0E+08 | − 86.1 | 8.1 | 0.3 |

$$\frac{Peak\ (B+C)}{Peak\ (A)} = \frac{[(2)+(4)+(5)+(6)+(3)]}{(1)}$$

SILICON CARBON COMPOSITE, NEGATIVE ELECTRODE ACTIVE MATERIAL, NEGATIVE ELECTRODE COMPOSITION, NEGATIVE ELECTRODE, AND LITHIUM SECONDARY BATTERY

CROSS-REFERENCE TO RELATED APPLICATIONS

This application claims priority to and the benefit of Korean Patent Application No. 10-2023-0136853 filed on Oct. 13, 2023, the disclosures of which are incorporated herein by reference in their entirety.

FIELD

The present application relates to a silicon carbon composite, a negative electrode active material, a negative electrode composition, a negative electrode, and a lithium secondary battery.

BACKGROUND

Recently, with the rapid spread of electronic devices using batteries, such as mobile phones, laptop computers, electric vehicles, electrically-powered tools and cleaners, the demand for small, lightweight, and relatively high-capacity and/or high-output secondary batteries is rapidly increasing. In particular, a lithium secondary battery is in the limelight as a driving power source for electronic devices because it is lightweight and has a high energy density. Accordingly, research and development efforts to improve the performance of the lithium secondary battery are being actively conducted.

Generally, a lithium secondary battery includes a positive electrode, a negative electrode, a separator interposed between the positive electrode and the negative electrode, an electrolyte, an organic solvent, and the like. In addition, the positive electrode and the negative electrode may be formed on current collectors with active material layers each including a positive electrode active material and a negative electrode active material. In general, for the positive electrode, a lithium-containing metal oxide such as $LiCoO_2$ and $LiMn_2O_4$ is used as the positive electrode active material, and for the negative electrode, a carbon-based active material or a silicon-based active material that does not contain lithium is used as the negative electrode active material.

Batteries using graphite as a negative electrode active material can exhibit a high discharge voltage of 3.6 V, but there is a limit to increasing energy density due to low capacity.

On the other hand, silicon-based active materials have high capacity and efficiency, and accordingly are attracting attention as next-generation negative electrode active materials. Therefore, there is a demand for development of silicon-based active materials with high capacity or efficiency characteristics.

SUMMARY

An exemplary embodiment of the present disclosure has been made in an effort to provide a silicon carbon composite that can be used as a negative electrode active material with excellent capacity and/or efficiency characteristics.

An exemplary embodiment of the present disclosure has been made in an effort to provide a silicon carbon composite that can be used as a negative electrode active material with excellent water-based processability and reduced gas generation.

An exemplary embodiment of the present disclosure has been made in an effort to provide a silicon carbon composite that can be used as a negative electrode active material with excellent life characteristics.

An exemplary embodiment of the present disclosure has been made in an effort to provide a negative electrode active material, a negative electrode composition, a negative electrode, and a lithium secondary battery, including the silicon carbon composite.

An exemplary embodiment of the present disclosure provides a silicon carbon composite satisfying a condition of $1.3 \leq ((B+C)/A) < 4$, wherein A is an intensity of a peak A having a chemical shift value in the range of 20 ppm to −15 ppm in a $^{29}Si$-MAS-NMR spectrum, B is an intensity of a peak B having a chemical shift value in the range of −20 ppm to −100 ppm in the $^{29}Si$-MAS-NMR spectrum; and C is an intensity of a peak C having a chemical shift value in the range of −110 ppm to −140 ppm in the $^{29}Si$-MAS-NMR spectrum.

In an exemplary embodiment of the present disclosure, the silicon carbon composite may comprise carbon in an amount of 38 part by weight to 50 parts by weight based on 100 parts by weight of the silicon carbon composite.

In an exemplary embodiment of the present disclosure, the silicon carbon composite may be a particle comprising a porous silicon-based particle and carbon disposed on at least a portion of an inside and a surface of the porous silicon-based particle.

In an exemplary embodiment of the present disclosure, the silicon carbon composite may further comprise a carbon layer formed on a surface of the silicon carbon composite, and a total weight of the carbon layer may be 5 wt % to 40 wt % based on 100 wt % of the silicon carbon composite.

In an exemplary embodiment of the present disclosure, the silicon carbon composite may have a BET surface area of 0.5 to 10 $m^2/g$.

In an exemplary embodiment of the present disclosure, the silicon carbon composite may have a pore volume of 0.005 to 0.03 $cm^3/g$.

In an exemplary embodiment of the present disclosure, the silicon carbon composite may have a pore size of 10 nm to 20 nm measured by the BET method.

In an exemplary embodiment of the present disclosure, the silicon carbon composite may have D90 particle diameter of 5 to 15 µm, D50 particle diameter of 1 to 10 µm, Dmin of 1 to 3 µm, and Dmax of 17 to 23 µm.

An exemplary embodiment of the present disclosure provides a negative electrode active material including the silicon carbon composite according to the above-described exemplary embodiment.

In an exemplary embodiment of the present disclosure, the negative electrode active material may comprise the silicon carbon composite in an amount of 0.1 part by weight to 14 parts by weight based on 100 parts by weight of the negative electrode active material.

In an exemplary embodiment of the present disclosure, the negative electrode active material may further include a carbon-based active material, and the carbon-based active material may be included in an amount of 86 parts by weight or more and 99.9 parts by weight or less based on 100 parts by weight of the negative electrode active material.

An exemplary embodiment of the present disclosure provides a negative electrode composition including the negative electrode active material according to the above-described exemplary embodiment; a binder; and a conductive material.

In an exemplary embodiment of the present disclosure, the negative electrode active material included in the negative electrode composition may further comprise a carbon-based active material.

An exemplary embodiment of the present disclosure provides a negative electrode including the negative electrode composition according to the above-described exemplary embodiment.

An exemplary embodiment of the present disclosure provides a lithium secondary battery including the negative electrode according to the above-described exemplary embodiment, a positive electrode, and a separator.

An exemplary embodiment of the present disclosure provides a battery module including the lithium secondary battery according to the above-described exemplary embodiment.

An exemplary embodiment of the present disclosure provides a battery pack including the lithium secondary battery according to the above-described exemplary embodiment.

An exemplary embodiment of the present disclosure provides a battery pack including the battery module according to the above-described exemplary embodiment.

An exemplary embodiment of the present disclosure provides a method for preparing a silicon carbon composite, the method comprising: performing a disproportionation reaction by heat treating a silicon oxide powder; etching the heat treated silicon oxide powder with an etchant; and obtaining a porous silicon-based particle by pulverizing the etched silicon oxide powder; and forming a silicon carbon composite by reacting the porous silicon-based particle with a carbon source to form a carbon layer on a surface of the porous silicon-based particle, wherein the silicon carbon composite satisfies a condition of $1.3 \leq ((B+C)/A) < 4$, wherein A is an intensity of a peak A having a chemical shift value in the range of 20 ppm to $-15$ ppm in a $^{29}$Si-MAS-NMR spectrum, B is an intensity of a peak B having a chemical shift value in the range of $-20$ ppm to $-100$ ppm in the $^{29}$Si-MAS-NMR spectrum; and C is an intensity of a peak C having a chemical shift value in the range of $-110$ ppm to $-140$ ppm in the $^{29}$Si-MAS-NMR spectrum.

According to the exemplary embodiments of the present disclosure, it is possible to provide a lithium secondary battery with improved capacity and/or efficiency by satisfying the condition that the intensities of a plurality of chemical shift values within a specific range in $^{29}$Si-MAS-NMR spectrum are within a specific ratio range. Specifically, life characteristics and/or water-based processability can be improved by satisfying the condition that the intensity ratio among peaks within a specific range is within a specific range. Within the range of intensity ratio according to the exemplary embodiments of the present disclosure, the higher the intensity, the advantages in capacity and efficiency are obtained, the change in phase stability (viscosity) in the negative electrode slurry including a binder such as carboxymethylcellulose (CMC) is reduced, and generation of gases such as $H_2$ is reduced, resulting in improvement in water-based processability.

DETAILED DESCRIPTION

Figure 1:
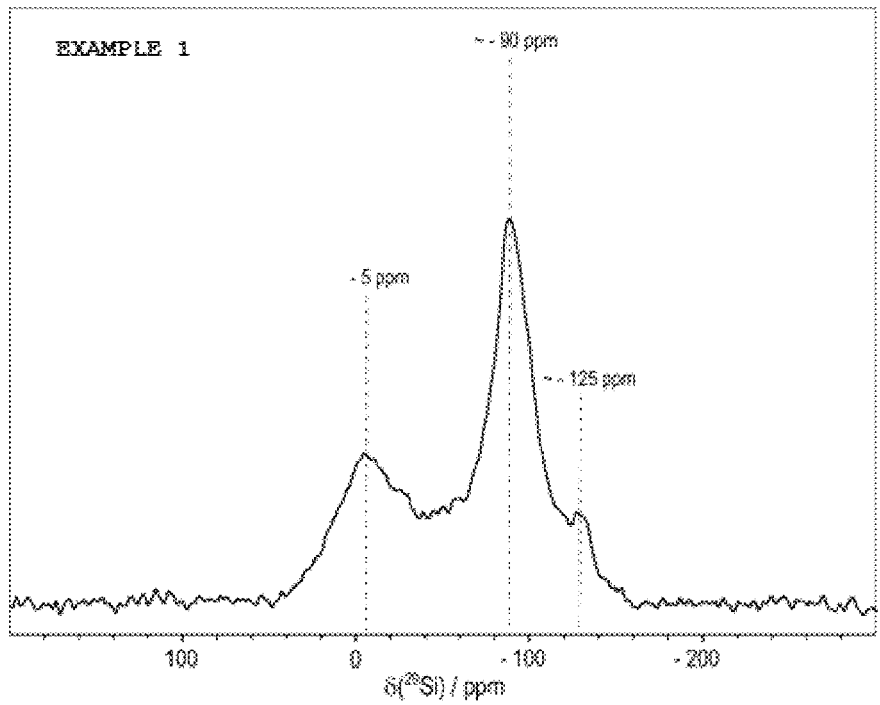
FIG. 1 is a graph showing NMR analysis results of silicon carbon composites prepared in Example 1.

Hereinafter, the present disclosure will be described in more detail for better understanding of the present disclosure. The present disclosure may be implemented in various different forms, and is not limited to the exemplary embodiments described herein. The terms or words used throughout the specification and the claims should not be construed as being limited to their ordinary or dictionary meanings, but construed as having meanings and concepts consistent with the technical idea of the present disclosure, based on the principle that an inventor may properly define the concepts of the words or terms to best explain the invention.

It should be understood that terms such as "comprise", "include" or "have" are intended to indicate the presence of a feature, number, step, component, or a combination thereof described in the present specification and do not preclude the possibility of the presence or addition of one or more other features or numbers, steps, components, or combinations thereof.

Further, it will be understood that when an element such as a layer is referred to as being "on" another element, it can be "directly on" the other element or an intervening element may also be present. In contrast, when an element is referred to as being "directly on" another element, there are no intervening elements present. Further, when an element is referred to as being "above" or "on" a reference portion, the element is positioned above or below the reference portion, and it does not necessarily mean that the element is positioned "above" or "on" in a direction opposite to gravity.

It should be understood that the terms or words used throughout the specification should not be construed as being limited to their ordinary or dictionary meanings, but construed as having meanings and concepts consistent with the technical idea of the present disclosure, based on the principle that an inventor may properly define the concepts of the words or terms to best explain the invention.

As used herein, the singular forms "a", "an" and "the" are intended to include the plural forms as well, unless the context clearly indicates otherwise.

Hereinafter, preferred embodiments of the present disclosure will be described in detail. However, it should be understood that the exemplary embodiments of the present disclosure may be modified in various forms and the scope of the present disclosure is not limited to the exemplary embodiments described below.

A silicon carbon composite according to an exemplary embodiment of the present disclosure has a feature that a ratio of a sum of intensities of a peak B and a peak C to an intensity of a peak A, $((B+C)/A)$, is 1.3 or greater and less than 4, where A is an intensity of the peak A having a chemical shift value in the range of 20 ppm to $-15$ ppm in a $^{29}$Si-MAS-NMR spectrum, B is an intensity of the peak B having a chemical shift value in the range of −20 ppm to −100 ppm in the $^{29}$Si-MAS-NMR spectrum; and C is an intensity of the peak C having a chemical shift value in the range of −110 ppm to −140 ppm in the $^{29}$Si-MAS-NMR spectrum. The ratio may be, for example, 1.3 or greater and 3.5 or less. Here, in a case where the peak A, the peak B, or the peak C includes two or more peaks, when calculating the ratio, the intensity of the corresponding peak is calculated as a sum of intensities of the two or more peaks. For example, in a case where there are two of the peak B's, when calculating the ratio, the intensity of peak B is calculated as a sum of intensities of the two peak B's.

In the present specification, $^{29}$Si-MAS-NMR spectrum is a spectrum measured by a solid 400 MHz WB (wide bore) NMR system and can be measured under the following conditions.

MAS (magic angle spinning) rate: 14 kHz
Spectral frequency (sfo1): 79.51 MHz (29Si)
Temperature: ambient temperature
29Si chemical shift reference: TMS (1) at 0 ppm
Pulse program: 1D Hahn-echo
Spectral width (sw): 100 kHz
Acquisition time: 40 ms
Carrier frequency (o1p) at −40 ppm
Pulse length (p1): 3 µs
Recycle delay (d1): 60 s
Number of scans: 1K to 5 k 'Gaussian/Lorentzian' is selected as a fitting model for analyzing a waveform measured using the above method. The parameters used for analysis consist of peak amplitude, peak position, peak full width at half maximum, and Gaussian/Lorentzian fraction (xG/(1−x)L). After setting appropriate initial values, fitting was performed. At this time, xG/(1−x)L was fixed to 0.3 (xG/(1−x)L=0.3). The fitting conditions used were nParVar=15, Step=1, and Thresh=0.001, and the fitting was performed repeatedly until an appropriate convergence value was reached.

In the present specification, a peak in $^{29}$Si-MAS-NMR spectrum refers to a peak with an intensity of 10% or greater of the maximum peak intensity, and those with an intensity of less than 10% of the maximum peak intensity are not included in the peak.

The peak A having a chemical shift value within a range of 20 ppm to −15 ppm in $^{29}$Si-MAS-NMR spectrum refers to a peak of silicon carbide (Si—C) in which silicon and carbon are covalently bonded, and the peak B having a chemical shift value within a range of −20 ppm to −100 ppm may refer to a peak of element Si itself or silicon oxide. A component represented by the peak B may be represented as SiOx (x is 0 or more and less than 2). For example, Si itself is a material that shows a peak at or around −79 ppm, so when the peak B appears at or around −89 ppm, it can be determined as being Si or SiOx.

The silicon carbon composite further has a peak C having a chemical shift value within a range of −110 ppm to −140 ppm in $^{29}$Si-MAS-NMR spectrum. The peak C means the presence of SiO$_2$. The peak C has a technical significance in that the capacity characteristics of the battery can be improved by ensuring that the ratio of (B+C)/A described above has a specific value.

The present inventors found that the peak B and the peak C are advantageous in capacity expression of a battery, and the peak A has an effect on improving water-based processability. In addition, the present inventors found that when the ratio of these intensities is within a certain range, both battery capacity and water-based processability can be improved. According to one example, the ratio ((B+C)/A) of sum of intensities of the peak B and the peak C to an intensity of the peak A is 1.3 or greater and less than 4. Within the above range, the battery exhibits excellent capacity and efficiency characteristics, and can exhibit excellent discharge capacity as an excellent silicon-based active material. In addition, within the above range, gas generation during a water-based process can be reduced, and decomposition of components such as a cellulose-based binder used together in the water-based process can be prevented, thereby maintaining phase stability and preventing a decrease in the viscosity of the slurry.

According to an exemplary embodiment, the silicon carbon composite may be represented by a Si/C-based active material. In the present specification, the silicon carbon composite is a composite of Si and C, and is distinguished from silicon carbide itself, denoted as SiC. The silicon carbide does not react electrochemically with lithium, so all performance, including life, may be measured as 0.

In the present specification, the silicon carbon composite is a composite of Si and C, where Si and C (for example, graphite) are present. respectively. For example, a peak of each of Si and C can be observed by an element analysis method such as XRD or NMR. In the present specification, the silicon carbon composite may be denoted as Si/C. The silicon carbon composite may contain an additional component as needed. For example, the silicon carbon composite may include silicon carbide denoted as SiC. When the silicon carbon composite includes silicon carbide, a content thereof is 3 wt % or less. The silicon carbon composite may be present in a crystalline state, an amorphous state, or a mixed state thereof. According to one example, C in the silicon carbon composite may be present in an amorphous state.

According to an exemplary embodiment, the silicon carbon composite may comprise carbon in an amount of 38 part by weight to 50 parts by weight based on 100 parts by weight of the silicon carbon composite. Specifically, the silicon carbon composite may comprise carbon in an amount of 38 parts by weight to 50 parts by weight, 38 parts by weight to 45 parts by weight, or 38 parts by weight to 43 parts by weight based on 100 parts by weight of the silicon carbon composite.

If the amount of the carbon is below the above range, the exposure of silicon on the surface of the silicon-carbon composite increases, raising the possibility of side reactions with water, thereby deteriorating aqueous processability. If the carbon exceeds the above range, the weight of the silicon becomes relatively low, making it difficult to achieve the desired capacity.

According to an exemplary embodiment, the silicon carbon composite may be a particle including a porous silicon-based particle and carbon provided on at least a portion of an inside and a surface of the porous silicon-based particle.

If necessary, a carbon layer may be further formed on a surface of the silicon carbon composite. By the carbon layer, the conductivity is imparted, and the initial efficiency, life characteristics, and battery capacity characteristics of the secondary battery can be improved. A total weight of the carbon layer may be 5 wt % to 40 wt % based on a total of 100 wt % of the silicon carbon composite particles. The carbon layer may include at least one of amorphous carbon and crystalline carbon.

According to an exemplary embodiment, the silicon carbon composite may be manufactured by a method comprising: performing a disproportionation reaction by heat treating a silicon oxide powder; and etching the heat treated silicon oxide powder with an etchant; obtaining a porous silicon-based particle by pulverizing the etched silicon oxide powder; and forming a silicon carbon composite by reacting the porous silicon-based particle with a carbon source to form a carbon layer on a surface of the porous silicon-based particle.

According to an exemplary embodiment, the silicon carbon composite may be a particle including a porous silicon-based particle and carbon provided on at least a portion of an inside and a surface of the porous silicon-based particle. This can be formed by etching silicon oxide to form porous silicon-based particles, such as a Si matrix, and then coating it with carbon. The description of the carbon layer described above may be applied to the carbon.

According to one example, the porous silicon-based particles may be manufactured by phase-separating silicon oxide (for example, SiO) into Si and silicon dioxide ($SiO_2$) by heat treatment and then performing etching with an etchant such as HF. When heat treating the silicon oxide, the grain size of Si corresponding to the peak B can be controlled by a disproportionation reaction (900 to 1400° C.). This makes it possible to adjust the ratio among the above-described peaks A, B, and C.

According to an exemplary embodiment, the silicon carbon composite may have a surface area of 0.5 to 10 $m^2/g$ measured by a BET method, and a pore volume of 0.005 to 0.03 $cm^3/g$, and a pore size of 10 to 20 nm measured by the BET method. The silicon carbon composite may have a pore volume of 0.005 to 0.03 $cm^3/g$ measured by a mercury penetration method (Hg porosimeter).

According to an exemplary embodiment, the silicon carbon composite may have a D90 particle diameter of 5 to 15 μm, a D50 particle diameter of 1 to 10 μm, a Dmin of 1 to 3 μm, and a Dmax of 17 to 23 μm. In the present specification, the average particle diameter ($D_{50}$) may be defined as a particle diameter corresponding to 50% of the cumulative volume in the particle diameter distribution curve of particles. The average particle diameter ($D_{50}$) may be measured using, for example, a laser diffraction method. In the laser diffraction method, in general, particle diameters ranging from a submicron region to several millimeters can be measured, and results with high reproducibility and high resolvability can be obtained.

An exemplary embodiment provides a negative electrode active material including the silicon carbon composite according to the above-described exemplary embodiments.

An exemplary embodiment provides a negative electrode composition including the negative electrode active material according to the above-described exemplary embodiment, a binder, and a conductive material.

According to an exemplary embodiment, the silicon carbon composite may be included in an amount of 0.1 part by weight to 14 parts by weight, for example, 0.1 part by weight to 12 parts by weight, or 1 part by weight to 10 parts by weight based on 100 parts by weight of the negative electrode active material.

According to an exemplary embodiment, the negative electrode active material may further include a carbon-based active material. The carbon-based active material may be included in an amount of 86 parts by weight or more and 99.9 parts by weight or less, 88 parts by weight or more and 99.9 parts by weight or less, for example, 90 parts by weight to 99 parts by weight, based on a total of 100 parts by weight of the negative electrode active material included in the negative electrode composition. The carbon-based active material may include at least one of natural graphite and artificial graphite. When the carbon-based active material includes both natural graphite and artificial graphite, a weight ratio of the artificial graphite and the natural graphite may be 1:99 to 99:1, for example, 1:9 to 9:1, or may be 3:7 to 7:3. For example, based on 100 parts by weight of the carbon-based active material, the content of the natural graphite may be 10 to 70 parts by weight, and the content of the artificial graphite may be 30 to 90 parts by weight.

The natural graphite refers to graphite that occurs naturally, and examples thereof include scaled graphite, scaly graphite, or soil graphite. The natural graphite has the advantages of being abundant, being low in price, having high theoretical capacity and compaction density, and being able to realize high output.

According to one example, spheroidized natural graphite may be used as the natural graphite, and the degree of spheroidization may be 0.9 or more. According to one example, the natural graphite may be spheroidized natural graphite and have a tap density of 0.9 g/cc or more.

In the present specification, the degree of spheroidization may be, when a particle is projected, a value obtained by dividing a circumference of a circle having the same area as a projected image by a circumferential length of the projected image. The degree of spheroidization may be obtained from an SEM image, or alternatively, may be measured using a particle shape analyzer, such as sysmex FPIA3000 available from Malvern. In addition, the crystal size can be confirmed through XRD analysis.

According to an exemplary embodiment of the present disclosure, the negative electrode composition may further include a binder and a conductive material, and the binder may be an aqueous binder.

The binder may include at least one selected from the group consisting of polyvinylidenefluoride-hexafluoropropylene copolymer (PVDF-co-HFP), polyvinylidenefluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butadiene rubber (SBR), fluoro rubber, poly acrylic acid, and the above-mentioned materials in which a hydrogen is substituted with Li, Na, Ca, etc., and may also include various copolymers thereof.

The conductive material is not particularly limited as long as it has conductivity without causing a chemical change in the battery, and for example, graphite such as natural graphite or artificial graphite; carbon black such as acetylene black, Ketjen black, channel black, furnace black, lamp black, and thermal black; a conductive fiber such as a carbon fiber and a metal fiber; a conductive tube such as a carbon nanotube; fluorocarbon powder, metal powder such as aluminum powder and nickel powder; a conductive whisker such as zinc oxide and potassium titanate; a conductive metal oxide such as titanium oxide; a conductive material such as a polyphenylene derivative, and the like may be used.

According to an exemplary embodiment, the aqueous binder is included in an amount of 1 to 5 wt %, for example, about 3 to 4 wt % based on the solid content of the negative electrode composition, and the conductive material is included in an amount of 0.1 to 2 wt %, for example, about 1 wt % based on the solid content of the negative electrode composition.

An exemplary embodiment of the present disclosure provides a negative electrode including the negative electrode composition according to the exemplary embodiments described above.

Specifically, the negative electrode may include a negative electrode current collector and a negative electrode active material layer arranged on at least one surface of the negative electrode current collector. The negative electrode active material layer includes the negative electrode composition according to the exemplary embodiments described above.

The negative electrode active material layer may be formed by applying a negative electrode slurry including the negative electrode composition described above to at least one surface of a negative electrode current collector, and drying and roll-pressing the same.

The negative electrode current collector is not particularly limited as long as it has conductivity without causing a chemical change in the battery. For example, for the current collector, copper, stainless steel, aluminum, nickel, titanium, fired carbon, aluminum or stainless steel each surface-treated with carbon, nickel, titanium, silver, or the like, or the like may be used. Specifically, transition metals that adsorb carbon well, such as copper and nickel, may be used for the current collector. A thickness of the current collector may be 6 μm to 20 μm. However, the thickness of the current collector is not limited thereto.

The negative electrode slurry may include a solvent for negative electrode slurry formation. Specifically, the solvent for negative electrode slurry formation may include at least one selected from the group consisting of distilled water, ethanol, methanol, and isopropyl alcohol, and specifically, distilled water, in terms of facilitating dispersion of components.

An exemplary embodiment of the present disclosure provides a lithium secondary battery including the negative electrode according to the above-described exemplary embodiment, a positive electrode, and a separator.

The positive electrode may include a positive electrode current collector and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, aluminum or stainless steel each surface-treated with carbon, nickel, titanium, silver, or the like, or the like may be used. In addition, the positive electrode current collector may typically have a thickness of 3 to 500 m, and a surface of the current collector may be formed with microscopic irregularities to enhance adhesive force of the positive electrode active material. For example, the positive electrode current collector may be used in various forms such as a film, a sheet, a foil, a net, a porous body, a foamed body, and a non-woven fabric body.

The positive electrode active material may be a positive electrode active material that is typically used. Specifically, the positive electrode active material may be a layered compound such as a lithium cobalt oxide ($LiCoO_2$) and a lithium nickel oxide ($LiNiO_2$), or a compound substituted with one or more transition metals; a lithium iron oxide such as $LiFe_3O_4$; a lithium manganese oxide such as chemical formula $Li_{1+c1}Mn_{2-c1}O_4$ ($0 \leq c1 \leq 0.33$), $LiMnO_3$, $LiMn_2O_3$ and $LiMnO_2$; a lithium copper oxide ($Li_2CuO_2$); a vanadium oxide such as $LiV_3O_8$, $V_2O_5$ and $Cu_2V_2O_7$; a Ni-site type lithium nickel oxide represented by chemical formula $LiNi_{1-c2}M_{c2}O_2$ (where M is at least one selected from the group consisting of Co, Mn, Al, Cu, Fe, Mg, B, and Ga, and satisfies $0.01 \leq c2 \leq 0.3$); a lithium manganese composite oxide represented by chemical formula $LiMn_{2-c3}M_{c3}O_2$ (where M is at least one selected from the group consisting of Co, Ni, Fe, Cr, Zn, and Ta, and satisfies $0.01 \leq c3 \leq 0.1$) or $Li_2Mn_3MO_8$ (where M is at least one selected from the group consisting of Fe, Co, Ni, Cu, and Zn); $LiMn_2O_4$ in which a part of Li of the chemical formula is substituted with an alkaline earth metal ion, or the like, but is not limited thereto. The positive electrode may be Li metal.

The positive electrode active material layer may include a positive electrode conductive material and a positive electrode binder together with the positive electrode active material described above.

In this case, the positive electrode conductive material is used to impart conductivity to the electrode, and can be used without particular limitation as long as the positive electrode conductive material has electronic conductivity without causing a chemical change in a battery to be constituted. Specific examples may include graphite such as natural graphite and artificial graphite; a carbon-based material such as carbon black, acetylene black, Ketjen black, channel black, furnace black, lamp black, thermal black and carbon fiber; metal powders or metal fibers such as copper, nickel, aluminum and silver; a conductive whisker such as zinc oxide and potassium titanate; a conductive metal oxide such as titanium oxide; or a conductive polymer such as polyphenylene derivative, or the like, and any one thereof or a mixture of two or more thereof may be used.

In addition, the positive electrode binder serves to improve bonding between particles of the positive electrode active material and adhesive force between the positive electrode active material and the positive electrode current collector. Specific examples may include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro rubber, or various copolymers thereof, and the like, and any one thereof or a mixture of two or more thereof may be used.

The separator serves to separate the negative electrode and the positive electrode and to provide a migration path of lithium ions, in which any separator may be used as the separator without particular limitation as long as it is typically used in a secondary battery, and particularly, a separator having high moisture-retention ability for an electrolyte solution as well as a low resistance to the movement of electrolyte ions may be preferably used. Specifically, a porous polymer film, for example, a porous polymer film manufactured from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a usual porous non-woven fabric, for example, a non-woven fabric formed of high melting point glass fibers, polyethylene terephthalate fibers, or the like may be used. Furthermore, a coated separator including a ceramic component or polymer material may be used so as to secure heat resistance or mechanical strength, and a separator having a single layer or multilayer structure may be selectively used.

The lithium secondary battery may further include an electrolyte. Examples of the electrolyte may include an organic liquid electrolyte, an inorganic liquid electrolyte, a solid polymer electrolyte, a gel-type polymer electrolyte, a solid inorganic electrolyte, or a molten-type inorganic electrolyte that may be used in the manufacturing of the lithium secondary battery, but are not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimetoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, methyl propionate, or ethyl propionate may be used.

In particular, among the carbonate-based organic solvents, ethylene carbonate and propylene carbonate, which are cyclic carbonates, are high-viscosity organic solvents and can be preferably used because they have high permittivity to dissociate a lithium salt well. When the cyclic carbonate is mixed with a linear carbonate with low viscosity and low permittivity, such as dimethyl carbonate and diethyl carbonate, in a suitable ratio and used, an electrolyte having high electric conductivity may be prepared, and therefore, may be more preferably used.

A lithium salt may be used as the metal salt, and the lithium salt is a material that is readily soluble in the non-aqueous electrolyte solution, in which, for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

One or more additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte for the purpose of improving life characteristics of the battery, suppressing a decrease in battery capacity, improving discharge capacity of the battery, and the like, in addition to the above-described electrolyte components.

Another exemplary embodiment of the present disclosure provides a battery module including the secondary battery as a unit cell, and a battery pack including the same. Since the battery module and the battery pack include the secondary battery having high capacity, high-rate capability, and high cycle characteristics, the battery module and the battery pack may be used as a power source of a medium to large sized device selected from the group consisting of an electric vehicle, a hybrid electric vehicle, a plug-in hybrid electric vehicle, and a power storage system.

Hereinafter, Examples will be described in detail to specifically describe the present specification. However, the Examples according to the present specification may be modified in other forms, and the scope of the present application is not construed as being limited to the following Examples. The Examples of the present application are provided to more completely explain the present specification to one skilled in the art.

Example 1

(1) Preparation of Silicon Carbon Composite

A disproportionation reaction of SiO was caused by heat treating 20 g of SiOx (x=0.9 to 1) powder at 1,200° C. in an inert atmosphere of argon gas.

After 10 g of the treated SiOx (x=0.9 to 1) powder was dispersed in distilled water, 10 ml of a 30 wt % HF aqueous solution was slowly added thereto while stirring the dispersion solution at a speed of 500 RPM. SiO powder obtained through the above process was etched for 2 hours. pH of the powder was made neutral through filtration or washing after the above preparing process. The obtained powder was subjected to a drying process at 130° C. for 6 hours under vacuum, so that porous silicon was prepared. Then, pulverization was performed using a mortar and pestle so that the particle size was D50 of 4 to 6 μm. Then, a silicon carbon composite including a carbon coating layer was prepared by reacting the porous silicon with acetylene ($C_2H_2$) by 1 L/min at $10^{-1}$ torr and at 720° C. for about 5 hours under an inert gas, Ar atmosphere using a CVD apparatus to form a carbon layer on a surface of the porous silicon. An NMR analysis result is shown in FIG. 1. According to FIG. 1, peaks corresponding to peaks A, B, and C appeared, and the ratio of (B+C)/A was measured to be 3.3.

(2) Preparation of Negative Electrode

A negative electrode slurry was prepared by mixing a negative electrode active material including the prepared silicon carbon composite and graphite at a weight ratio of 9:91; a conductive material including carbon black and SWCNT; and a binder including carboxymethyl cellulose (CMC) and styrene butadiene rubber (SBR) at a weight ratio of 95.3:1:3.6 and adding an appropriate amount of distilled water so that the total solid content was about 46 wt %.

The negative electrode slurry was applied to a Cu metal thin film with a thickness of about 20 μm, which was then dried at a circulating air temperature of 60° C. Then, the thin film was roll-pressed, dried in a vacuum oven of 130° C. for about a day, and punched into a circular shape of 1.4875 cm² to prepare a negative electrode.

(3) Preparation of Secondary Battery

A Li metal thin film punched to be 1.7671 cm² was used as a positive electrode. A Li coin half-cell was prepared by interposing a porous polyethylene separator between the positive electrode and the negative electrode and injecting an electrolyte solution in which 1M $LiPF_6$ was dissolved in a mixed solution prepared by mixing EMC (methyl ethyl carbonate) and EC (ethylene carbonate) at a mixing ratio of 7:3 and an additive was included.

Example 2

Figure 2:
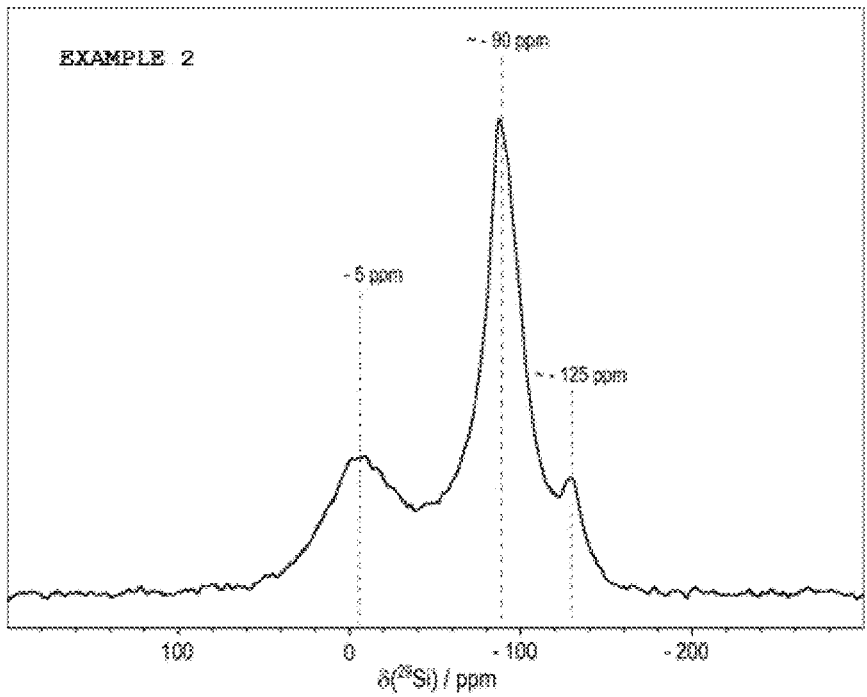
FIG. 2 is a graph showing NMR analysis results of silicon carbon composites prepared in Example 2.

A silicon carbon composite was prepared in the same manner as in Example 1, except that the temperature of disproportionation reaction was set to 1,150° C. and carbon coating layer was prepared by reacting the porous silicon with acetylene ($C_2H_2$) at 700° C. An NMR analysis result of the active material prepared by the method of Example 2 is shown in FIG. 2. According to FIG. 2, peaks corresponding to peaks A, B, and C appeared, and the ratio of (B+C)/A was measured to be 3.5.

By using the prepared silicon carbon composite, a negative electrode and a secondary battery were prepared in the same manner as in Example 1.

Figure 7:
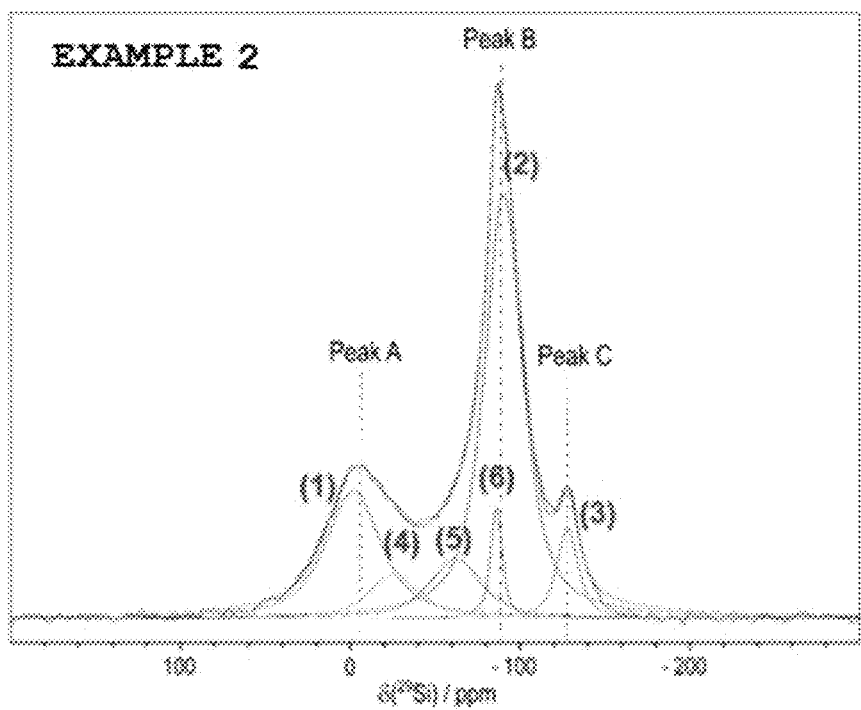
FIG. 7 shows a waveform analysis result based on the NMR analysis result of the silicon carbon composite of Example 2.

FIG. 7 shows a result of waveform analysis of the NMR analysis result of FIG. 2. The silicon carbon composite of Example 2 has peaks (1) to (6), in which peak (1) corresponds to the peak A, and peaks (2), (4), (5), and (6) correspond to the peak B, and peak (3) corresponds to the peak C. When calculating the ratio of (B+C)/A, B was calculated as the sum of the intensities of the peaks (2), (4), (5), and (6).

Example 3

Figure 3:
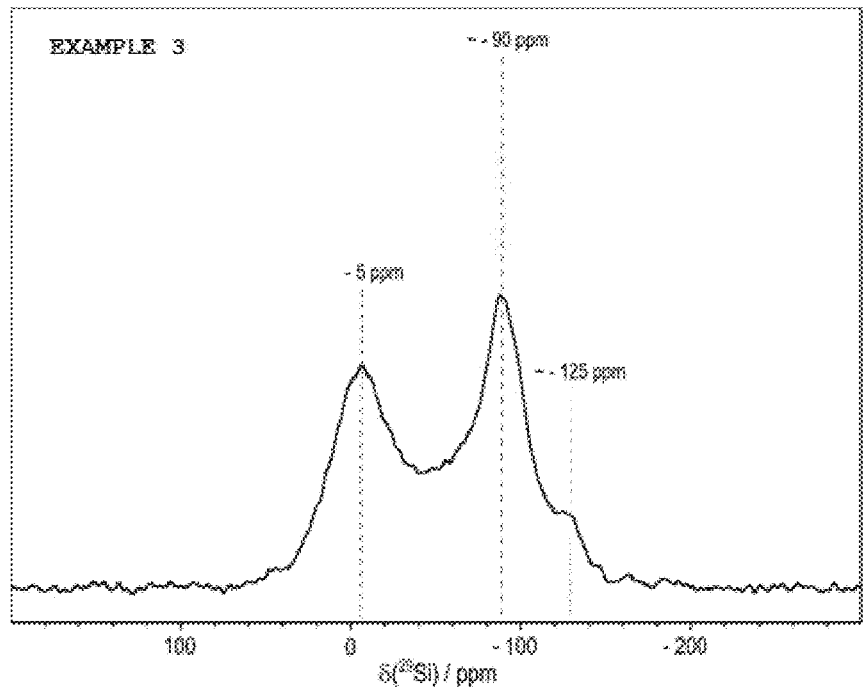
FIG. 3 is a graph showing NMR analysis results of silicon carbon composites prepared in Example 3.

A silicon carbon composite was prepared in the same manner as in Example 1, except that the temperature of disproportionation reaction was set to 1,000° C. and carbon coating layer was prepared by reacting the porous silicon with acetylene ($C_2H_2$) at 750° C. An NMR analysis result of the active material prepared by the method of Example 3 is shown in FIG. 3. According to FIG. 3, peaks corresponding to peaks A, B, and C appeared, no peaks appeared at –205 ppm to –300 ppm, and the ratio of (B+C)/A was measured to be 2.1.

By using the prepared silicon carbon composite, a negative electrode and a secondary battery were prepared in the same manner as in Example 1.

Example 4

Figure 4:
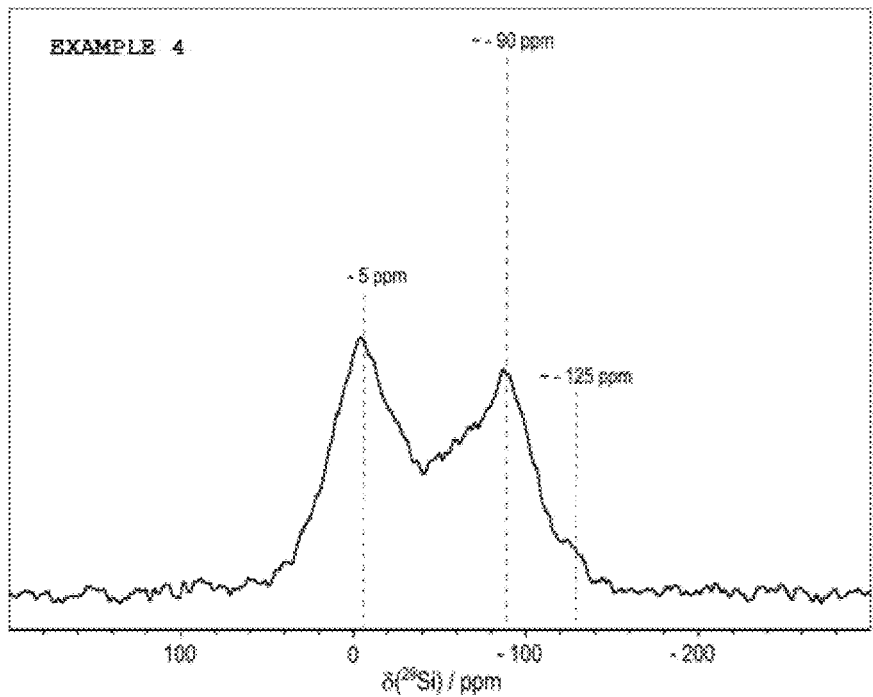
FIG. 4 is a graph showing NMR analysis results of silicon carbon composites prepared in Example 4.

A silicon carbon composite was prepared in the same manner as in Example 1, except that the temperature of disproportionation reaction was set to 900° C. and carbon coating layer was prepared by reacting the porous silicon with acetylene ($C_2H_2$) at 770° C. As a result of NMR analysis of the active material prepared by the method of Example 4, according to FIG. 4, peaks corresponding to peaks A, B, and C appeared, and the ratio of (B+C)/A was measured to be 1.4. By using the prepared silicon carbon composite, a negative electrode and a secondary battery were prepared in the same manner as in Example 1.

Comparative Example 1

(1) Method for Preparing Silicon Oxide Containing Magnesium

Si and $SiO_2$ were mixed at a 1:1 molar ratio in crucible no. 1 and heated to a sublimation temperature of 1400° C. In crucible no. 2, magnesium metal was separately heated to 600 to 1000° C. and evaporated. All of the crucibles were depressurized to 0.1 torr. The vaporous mixture containing Mg obtained from crucible no. 1 and crucible no. 2 was reacted for 6 hours, and then condensed to a solid phase in a vacuum region of 800° C. The silicon-based active material prepared by the above method was pulverized for 3 to 4 hours using ball mill equipment to prepare particles with a D50 of about 6 μm. Then, a silicon oxide containing magnesium was prepared by reacting the particles with methane ($CH_4$) by 1 L/min at $10^{-1}$ torr for about 5 hours under an inert gas, Ar atmosphere using a CVD apparatus to form a carbon layer on a surface of the silicon-based active material. The content of Mg in the powder was analyzed by ICP-MS and measured to be 8 wt %.

Figure 5:
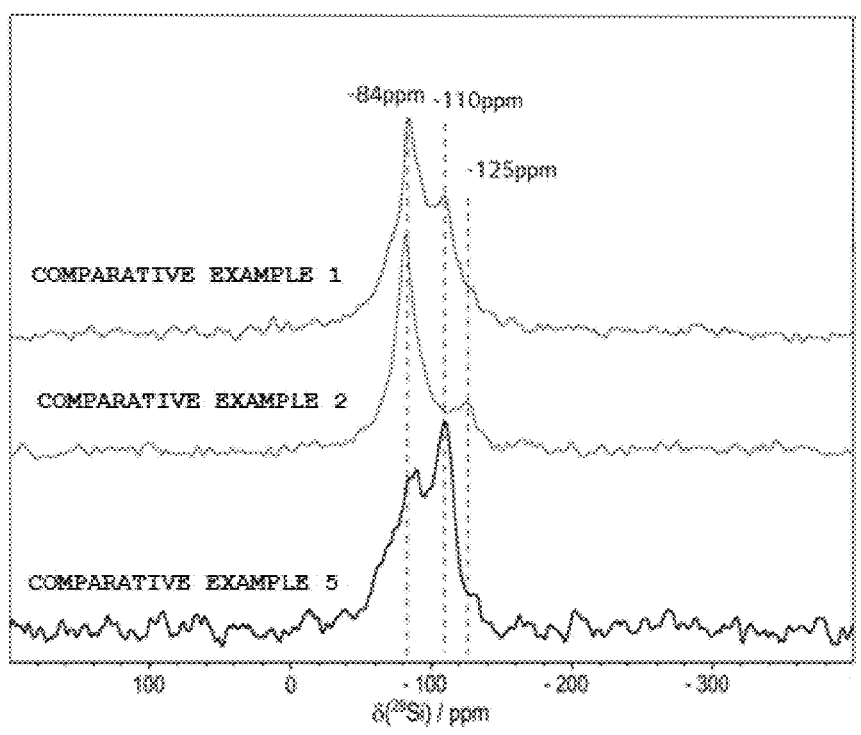
FIG. 5 is a graph showing NMR analysis results of silicon carbon composites prepared in Comparative Examples 1, 2 and 5.

As a result of NMR analysis of silicon oxide prepared by the method, according to FIG. 5, peaks corresponding to peaks B and C appeared, peak A did not appear, and the ratio of (B+C))/A was not measurable because there was no peak A.

By using the prepared silicon carbon composite, a negative electrode active material was prepared to include the prepared silicon carbon composite and graphite at a weight ratio of 15:85, and a negative electrode and a secondary battery were prepared in the same manner as in Example 1.

Comparative Example 2

A silicon oxide was prepared by the same method as in Comparative Example 1, except that the active material was prepared without the metal magnesium in crucible no. 2 in Comparative Example 1. As a result of NMR analysis of silicon oxide prepared by the method, according to FIG. 5, peaks corresponding to peaks B and C appeared, peak A did not appear, and the ratio of (B+C))/A was not measurable because there was no peak A.

By using the prepared silicon carbon composite, a negative electrode active material was prepared to include the prepared silicon carbon composite and graphite at a weight ratio of 12:88, and a negative electrode and a secondary battery were prepared in the same manner as in Example 1.

Comparative Example 3

The same method as in Example 1 was performed, except that the temperature of the CVD carbon coating process, which was carried out for the porous silicon using acetylene ($C_2H_2$) in Example 1, was set to 900° C. As a result of NMR analysis of the silicon carbon composite prepared in this way, peaks corresponding to peaks A, B, and C appeared, and the ratio of (B+C)/A was measured to be 0.8.

By using the prepared silicon carbon composite, a negative electrode and a secondary battery were prepared in the same manner as in Example 1.

Comparative Example 4

A mixed gas of 1 L/min of silane, 3 L/min of acetylene, and 1 L/min of argon was introduced into a fluidized bed reactor deposition chamber at a temperature of 700° C. and a pressure of 1 atm. A silicon-carbon composite was obtained in the collection chamber of the fluidized bed reactor. As a result of NMR analysis of the silicon carbon composite prepared in this way, peaks corresponding to peaks A, B, and C appeared, and the ratio of (B+C)/A was measured to be 2.8.

By using the prepared silicon carbon composite, a negative electrode active material was prepared to include the prepared silicon carbon composite and graphite at a weight ratio of 11:89, and a negative electrode and a secondary battery were prepared in the same manner as in Example 1.

Comparative Example 5

1 kg of silicon powder and 1 kg of silica powder were placed into a vacuum reactor, and a vacuum was first formed at 0.1 torr or less. The materials were then heated to 1400° C., converting them into vapor. Simultaneously, a benzene solution was slowly passed through, causing the benzene to rapidly vaporize. After the benzene vapor was thoroughly mixed with the vapor of the silicon/silica mixture, the mixed vapor was cooled and deposited on a water-cooled substrate. The resulting material was crushed to obtain silicon oxide in which carbon atoms were uniformly inserted at the atomic level. Afterward, the crushed material was carbon-coated, and 1 kg of the material was placed into a rotary furnace, heated to 1000° C. under an argon protective gas atmosphere. A mixed gas of argon and an equal amount of propylene and methane was introduced at a 1:1 volume ratio for vapor coating, with the volume ratio of propylene to methane being 2:3. After maintaining the temperature for 1 hour and cutting off the supply of the organic gas, the material was cooled to obtain silicon oxide. As a result of NMR analysis of the silicon carbon composite prepared in this way, according to FIG. 5, peaks corresponding to peaks B, and C appeared, peak A did not appear, and the ratio of (B+C)/A was not measurable because there was no peak A.

By using the prepared silicon carbon composite, a negative electrode active material was prepared to include the prepared silicon carbon composite and graphite at a weight ratio of 12:88, and a negative electrode and a secondary battery were prepared in the same manner as in Example 1.

Comparative Example 6

Figure 6:
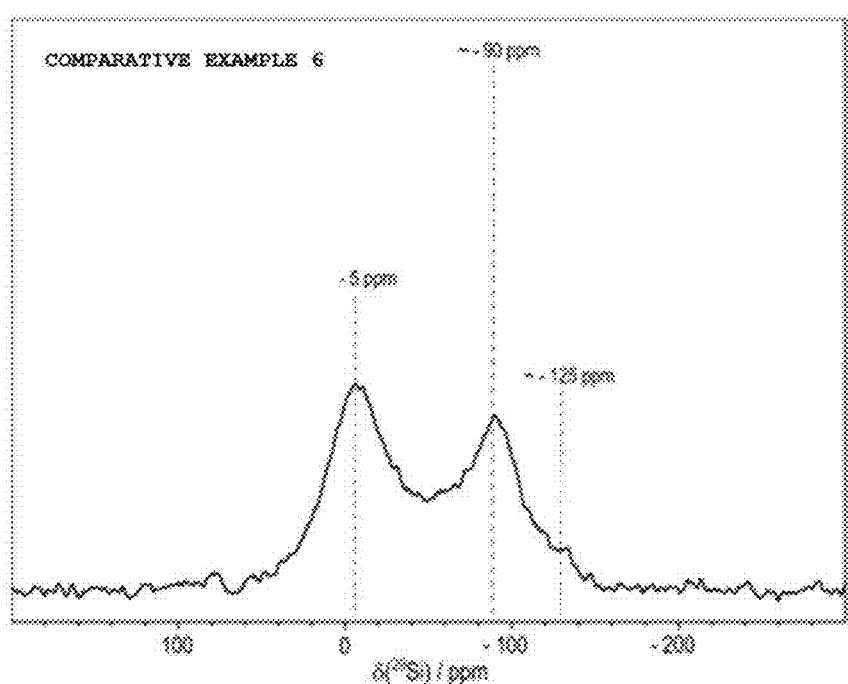
FIG. 6 is a graph showing NMR analysis results of silicon carbon composites prepared in Comparative Example 6.

The same method as in Example 1 was performed, except that the temperature of disproportionation reaction was set to 1250° C., the temperature of the CVD carbon coating process, which was carried out for the porous silicon using acetylene ($C_2H_2$) in Example 1, was set to 650° C. An NMR analysis result of the active material prepared by the method of Comparative Example 6 is shown in FIG. 6. According to FIG. 6, peaks corresponding to peaks A, B, and C appeared, and the ratio of (B+C)/A was measured to be 1.1.

By using the prepared silicon carbon composite, a negative electrode active material was prepared to include the prepared silicon carbon composite and graphite at a weight ratio of 15:85, and a negative electrode and a secondary battery were prepared in the same manner as in Example 1.

The ratios among peaks specified by NMR analysis of the silicon-based active materials prepared in Examples and Comparative Examples are shown in Table 1 below.

In addition, the C content, O content, and Si content of each example and comparative example were measured using a carbon sulfur analyzer (CS Analyzer) and an oxygen nitrogen hydrogen analyzer (ONH Analyzer), and the results thereof and the weight ratio of the silicon carbon composite to the graphite included in the negative active material are shown in Table 2 below.

[Evaluation of Battery Performance]

The prepared batteries were charged and discharged to evaluate discharge capacity, initial efficiency, and capacity retention rate, and the evaluation results are shown in Table 1 below.

The charging and discharging were performed at 0.1 C for the first cycle and the second cycle, and the charging and discharging were performed at 0.5 C from the third cycle to the 49th cycle. At the 50th cycle, the charging and discharging were terminated in a charge state (with lithium contained in the negative electrode).

Charging conditions: CC (constant current)/CV (constant voltage) (5 mV/0.005 C current cut-off)

Discharging conditions: CC (constant current) condition 1.5 V

The discharge capacity (mAh/g) and the initial efficiency (%) were derived from the result after charging and discharging once. Specifically, the initial efficiency (%) was derived by the following calculation.

$$\text{Initial efficiency (\%)} = (\text{one time discharge capacity/one time charge capacity}) \times 100$$

The capacity retention rate was derived by the following calculation.

$$\text{Capacity retention rate (\%)} = (49 \text{ times discharge capacity/one time discharge capacity}) \times 100$$

[Evaluation of Water-Based Processability]
1) Evaluation of Processability (Shear Viscosity) Characteristics As part of the evaluation of processability, the amounts of change in shear viscosity at shear rate=1 Hz of a slurry prepared in Examples and Comparative Examples, and are shown in Table 2 below. Specifically, the amount of change (%) in shear viscosity was derived by the following calculation formula.

$$\text{Amount of change (\%) in shear viscosity} = ((\text{shear viscosity of slurry after 48 h} - \text{shear viscosity of slurry immediately after mixing})/ \text{shear viscosity of slurry immediately after mixing}) \times 100$$

2) Time Point of Gas Generation

After 20 g of slurry was put into an aluminum pouch of 10×15 cm and vacuum-sealed, a change in volume was measured using Archimedes' principle, and a time point at which 2 mL or more of change in volume at 60° C. occurred was defined as a time point of gas generation.

TABLE 1

| Battery | NMR (B + C)/A ratio | Discharge capacity (mAh/g) | Initial efficiency (%) | Capacity retention rate (%) 100 cycle | Amount of change (%) in shear viscosity | Time point of gas generation (day) |
|---|---|---|---|---|---|---|
| Example 1 | 3.3 | 494 | 90 | 90 | 0 | 8 |
| Example 2 | 3.5 | 489 | 89 | 92 | 0 | 8 |
| Example 3 | 2.1 | 476 | 89 | 89 | 0 | 8 |
| Example 4 | 1.4 | 465 | 88 | 87 | 0 | 8 |
| Comparative Example 1 | — | 445 | 86 | 85 | 2 | 7 |
| Comparative Example 2 | — | 455 | 85 | 82 | 2 | 7 |
| Comparative Example 3 | 0.8 | 300 | 80 | 50 | 0 | — |
| Comparative Example 4 | 2.8 | 513 | 89 | 82 | 30 | 2 |

TABLE 1-continued

| Battery | NMR (B + C)/A ratio | Discharge capacity (mAh/g) | Initial efficiency (%) | Capacity retention rate (%) 100 cycle | Amount of change (%) in shear viscosity | Time point of gas generation (day) |
|---|---|---|---|---|---|---|
| Comparative Example 5 | — | 463 | 87 | 81 | 2 | 7 |
| Comparative Example 6 | 1.1 | 535 | 89 | 50 | 45 | 2 |

TABLE 2

| | C content(%) based on silicon carbon composite | O content(%) based on silicon carbon composite | Si content(%) based on silicon carbon composite | Weight ratio of silicon carbon composite to graphite |
|---|---|---|---|---|
| Example 1 | 38.6 | 1.2 | 60.2 | 9:91 |
| Example 2 | 43 | 0.4 | 56.6 | 9:91 |
| Example 3 | 40 | 1 | 59 | 9:91 |
| Example 4 | 40 | 1.7 | 58.3 | 9:91 |
| Comparative Example 1 (Mg content: 8%) | 3.5 | 30.9 | 57.6 | 15:85 |
| Comparative Example 2 | 3.5 | 34.0 | 62.5 | 12:88 |
| Comparative Example 3 | 40 | 1 | 59 | 9:91 |
| Comparative Example 4 | 55 | 1 | 44 | 11:89 |
| Comparative Example 5 | 0.9 | 35.5 | 63.6 | 12:88 |
| Comparative Example 6 | 40 | 1.1 | 58.9 | 15:85 |

In Examples 1 to 4, materials that have peaks corresponding to peaks A, B, and C and satisfy peak ratio satisfies the scope of the present disclosure were applied to the battery. As shown in Table 1, while certain or more effects were achieved in terms of the discharge capacity, the initial efficiency, and the capacity retention rate, the viscosity change and gas generation were below a certain level.

On the other hand, Comparative Examples 1, 2, and 5 not satisfying the above said peak ratio, resulted in inferior effects in both capacity and aqueous processability. Specifically, in Comparative Examples 1, 2, and 5, an adequate amount of SiC was not generated, so the A peak did not appear in the NMR analysis. Consequently, the aqueous processability was poor due to reactions with the electrolyte. In Comparative Example 3, the temperature was too high during the formation of the carbon coating layer, leading to the generation of an excessive amount of SiC, which did not contribute to capacity, thereby degrading cell performance.

Although Comparative Example 4 satisfied the peak ratio of the present disclosure, the carbon content in the silicon-carbon composite was too low, causing the surface silicon to be exposed and resulting in side reactions with water, which led to inferior aqueous processability.

In the case of Comparative Example 6, while it did not satisfied the peak ratio of the present disclosure, the excessive inclusion of the silicon-carbon composite in the negative electrode active material led to inferior in terms of cycle performance and aqueous processability.

What is claimed is:

1. A silicon carbon composite satisfying a condition of $1.3 \leq ((B+C)/A) < 4$, wherein A is an intensity of peak A having a chemical shift value in the range of 20 ppm to −15 ppm in a $^{29}$Si-MAS-NMR spectrum, B is an intensity of peak B having a chemical shift value in the range of −20 ppm to −100 ppm in the $^{29}$Si-MAS-NMR spectrum; and C is an intensity of peak C having a chemical shift value in the range of −110 ppm to −140 ppm in the $^{29}$Si-MAS-NMR spectrum.

2. The silicon carbon composite of claim 1, wherein the silicon carbon composite comprises carbon in an amount of 38 part by weight to 50 parts by weight based on 100 parts by weight of the silicon carbon composite.

3. The silicon carbon composite of claim 1, wherein the silicon carbon composite is a particle comprising a porous silicon-based particle and carbon disposed on at least a portion of an inside and a surface of the porous silicon-based particle.

4. The silicon carbon composite of claim 1, wherein the silicon carbon composite further comprises a carbon layer formed on a surface of the silicon carbon composite, wherein a total weight of the carbon layer is 5 wt % to 40 wt % based on 100 wt % of the silicon carbon composite.

5. The silicon carbon composite of claim 1, wherein the silicon carbon composite has a BET surface area of 0.5 to 10 m²/g.

6. The silicon carbon composite of claim 1, wherein the silicon carbon composite has a pore volume of 0.005 to 0.03 cm³/g.

7. The silicon carbon composite of claim 1, wherein the silicon carbon composite has a pore size of 10 nm to 20 nm measured by the BET method.

8. The silicon carbon composite of claim 1, wherein the silicon carbon composite has D90 particle diameter of 5 to 15 μm, D50 particle diameter of 1 to 10 μm, Dmin of 1 to 3 μm, and Dmax of 17 to 23 μm.

9. A negative electrode active material comprising the silicon carbon composite of claim 1.

10. The negative electrode active material of claim 9, wherein the negative electrode material comprises the silicon carbon composite in an amount of 0.1 part by weight to 14 parts by weight based on 100 parts by weight of the negative electrode active material.

11. The negative electrode active material of claim 9, wherein the negative electrode active material further includes a carbon-based active material, and wherein the carbon-based active material is included in an amount of 86 parts by weight or more and 99.9 parts by weight or less based on 100 parts by weight of the negative electrode active material.

12. A negative electrode composition comprising:

the negative electrode active material of claim 9;

a binder; and a conductive material.

13. The negative electrode composition of claim 12, wherein the negative electrode active material further comprises a carbon-based active material.

14. A negative electrode comprising the negative electrode composition of claim 12.

15. A lithium secondary battery comprising:

the negative electrode of claim 14;

a positive electrode; and a separator.

16. A battery module comprising the lithium secondary battery of claim 15.

17. A battery pack comprising the lithium secondary battery of claim 15.

18. A battery pack comprising the battery module of claim 16.

19. A method for preparing a silicon carbon composite, the method comprising:

performing a disproportionation reaction by heat treating a silicon oxide powder;

etching the heat treated silicon oxide powder with an etchant; and obtaining a porous silicon-based particle by pulverizing the etched silicon oxide powder; and forming a silicon carbon composite by reacting the porous silicon-based particle with a carbon source to form a carbon layer on a surface of the porous silicon-based particle, wherein the silicon carbon composite satisfies a condition of $1.3 \leq ((B+C)/A) < 4$, wherein A is an intensity of a peak having a chemical shift value in the range of 20 ppm to $-15$ ppm in a $^{29}$Si-MAS-NMR spectrum, B is an intensity of a peak having a chemical shift value in the range of $-20$ ppm to $-100$ ppm in the $^{29}$Si-MAS-NMR spectrum; and C is an intensity of a peak having a chemical shift value in the range of $-110$ ppm to $-140$ ppm in the $^{29}$Si-MAS-NMR spectrum.

* * * * *